(12) United States Patent
Draisey et al.

(10) Patent No.: US 6,923,980 B2
(45) Date of Patent: *Aug. 2, 2005

(54) CAPSULES

(75) Inventors: Allan Draisey, Felpham (GB); Richard Martin Rencourt, Horndean (GB); Ryan Grimes, Southampton (GB)

(73) Assignee: Stanelco Fibre Optics Ltd., Fareham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/220,621
(22) PCT Filed: Mar. 15, 2001
(86) PCT No.: PCT/GB01/01147
§ 371 (c)(1), (2), (4) Date: Sep. 4, 2002
(87) PCT Pub. No.: WO01/68452
PCT Pub. Date: Sep. 20, 2001

(65) Prior Publication Data
US 2003/0009879 A1 Jan. 16, 2003

(30) Foreign Application Priority Data
Mar. 17, 2000 (GB) .............................................. 0006432

(51) Int. Cl.$^7$ ........................ A61K 47/00; B32B 31/00; B29C 39/10
(52) U.S. Cl. ...................... 424/439; 156/145; 156/242; 156/272.4; 264/4; 424/451
(58) Field of Search ................................ 264/445, 4.33, 264/4; 424/439, 451; 156/145, 242, 272.4, 267, 250; 206/528, 529, 530

(56) References Cited

U.S. PATENT DOCUMENTS

| 2,497,212 A | * | 2/1950 | Donofrio | 53/443 |
| 4,820,364 A | * | 4/1989 | Graham | 156/69 |
| 5,146,730 A | * | 9/1992 | Sadek et al. | 53/454 |
| 6,598,371 B1 | * | 7/2003 | Draisey | 53/374.8 |
| 6,755,010 B2 | * | 6/2004 | Draisey | 53/454 |

FOREIGN PATENT DOCUMENTS

GB         908344      * 12/1958

* cited by examiner

Primary Examiner—Thurman K. Page
Assistant Examiner—Micah-Paul Young
(74) Attorney, Agent, or Firm—William H. Holt

(57) ABSTRACT

Capsules, for example for the delivery of pharmaceuticals, are produced from at least three films (12, 13, 14) of a water-soluble polymeric material, by deforming two of the films (12, 14) to form a multiplicity of recesses, and filling the recesses (18, 32) with a flowable filling material. A film (13) is used to cover the recesses (18) in at least one of the films (12), and is welded to it by dielectric welding. The films with filled recesses are then brought together and welded together by dielectric welding to form filled capsules, which are cut or punched out of the welded film. The polymeric material may be gelatin, or a water-soluble cellulose derivative such as hydroxypropyl methyl cellulose, and may also contain a plasticiser.

7 Claims, 2 Drawing Sheets

CAPSULES

This invention relates to a process and an apparatus for forming capsules, for example for the delivery of pharmaceuticals, and also to the resulting capsules.

A variety of pharmaceuticals and other materials are delivered in capsules. Where the material is a particulate material such as a powder it may be enclosed in a hard capsule, typically of elongated round-ended cylindrical shape, made in two pieces for assembly around the material. Both liquid and particulate material may be enclosed in soft capsules, these capsules being made from films of a soft elastic polymer which are brought together between rotating dies that have cavities in their surfaces. The material to fill the capsules is supplied between the films as the films deform into the cavities; as the dies move the films come together and are sealed together by application of heat and/or pressure at the dies. Both types of capsules are commonly made from gelatin films. The bonding of thermoplastic polymer films using dielectric heating (or radio frequency heating) has also been known for many years. In this process the two pieces of thermoplastic material are positioned between opposed electrodes (or one electrode and a base plate), the electrodes are pressed together, and a radio frequency voltage is applied between the electrodes. This process is however applicable only to those materials which have a significant dielectric loss index, for example greater than 0.2, over the range say 20–60 MHz, for example polyvinylchloride. Dielectric welding has not hitherto been considered suitable for welding the water-soluble polymers which are desirably used in making capsules for pharmaceuticals.

According to the present invention there is provided a process for making capsules, the process using at least three films of a water-soluble or edible polymeric material, and the process comprising the steps of deforming two of the films to form a multiplicity of recesses, filling the recesses with a flowable filling material with the films in a substantially horizontal position, welding a flat film onto at least one of the films with filled recesses by dielectric welding to form a multiplicity of covered recesses containing the filling material, bringing the two films containing recesses together with the recesses aligned, and welding the two films together by dielectric welding, and cutting the filled enclosures from the remaining parts of the films so as to form a multiplicity of capsules.

Each welding location is defined by two opposed electrodes, which can be pressed together, and to which a power supply means can provide a high frequency electrical supply. The supply may in principle be at a frequency between 1 MHz and 200 MHz, usually between 10 MHz and 100 MHz, but stringent limits are imposed on any emitted radio waves. In practice therefore the choice of frequency may be more limited. For example the supply frequency may be 27.12 MHz, or 40.68 MHz. A tuned circuit may be electrically connected to at least one of the electrodes, for example the tuned circuit may be connected between one electrode and ground potential. For example a tuned circuit comprising an inductor and a capacitor in series may be connected between one electrode and ground potential, the tuned circuit preferably resonating at a frequency substantially that of the supply.

The electrodes defining the welding location are preferably movable towards and away from each other, to allow the films to be held and pressed between them. A heater may be associated with at least one of the electrodes, to provide heating of the films. At least one of the electrodes may comprise recesses complementary to the shape of the recesses defined in the films. Retaining means may be provided for retaining the films against the or each electrode during welding, and the retaining means may operate by suction.

The recesses may be formed by moulding, preferably by placing the films against a mould having a multiplicity of cavities corresponding to the shapes of the recesses to be formed. The films may be moulded by suction into the cavities. The material may be softened prior to moulding, for example by heating. The cutting out of the capsules is preferably performed by punching, and the punches may also be incorporated in the welding electrodes for the second welding step.

The filling material may be a pharmaceutical, or a food or drink ingredient, and may be a powder, a paste, a granular material or a liquid. Where the capsules are intended to be swallowed (for example where they contain a pharmaceutical or a nutritional supplement), the polymeric material should be ingestible. It may for example be gelatin, or a water-soluble cellulose derivative. For example it may be hydroxypropyl methyl cellulose, which is approved for use with pharmaceuticals and in food (being indicated by the code E464 in Europe). Other suitable polymeric materials would be edible seaweed-derived polymers such as sodium alginate (E401), propylene glycol alginate (E405) or agar-agar (E406). The polymeric material must not contain any harmful or toxic additives, but may contain compounds such as glycerol (E422) or glycerol monostearate (E471) as plasticisers, these compounds also being ingestible and dispersible or soluble in water. Other suitable cellulose derivatives are hydroxypropyl cellulose (E463), and methyl ethyl cellulose (E465). In any event the presence of a plasticiser in the polymer film is beneficial to both the formation of the recesses and the welding process. There is no requirement any water to be added to the film, and indeed it is preferable that the film should be at least superficially dry, that is to say in equilibrium with ambient conditions. For example the film might be in equilibrium with air at a temperature of 25° C. and a relative humidity of 40%. For example it might be stored before use in a controlled humidity environment, with a relative humidity preferably in the range 30% to 70%. Under such circumstances the film would evidently incorporate some water but would appear completely dry, and such incorporated water would tend to act as a plasticiser.

The filling steps may be carried out using accurate dispensing equipment to ensure that a predetermined quantity of material is in each recess. It will be appreciated that the process produces capsules which are divided by a central film into two compartments, and it will be understood that the filling materials in the two compartments may be the same, or may be different.

The invention also provides an apparatus for making and filling capsules by the method specified above, comprising stations operable to implement sequentially the steps of the method specified above. In a further aspect, the invention provides a capsule formed by the method or apparatus of the invention.

The invention will now be further and more particularly described, by way of example only, and with reference to the accompanying drawings, in which.

Figure 1:
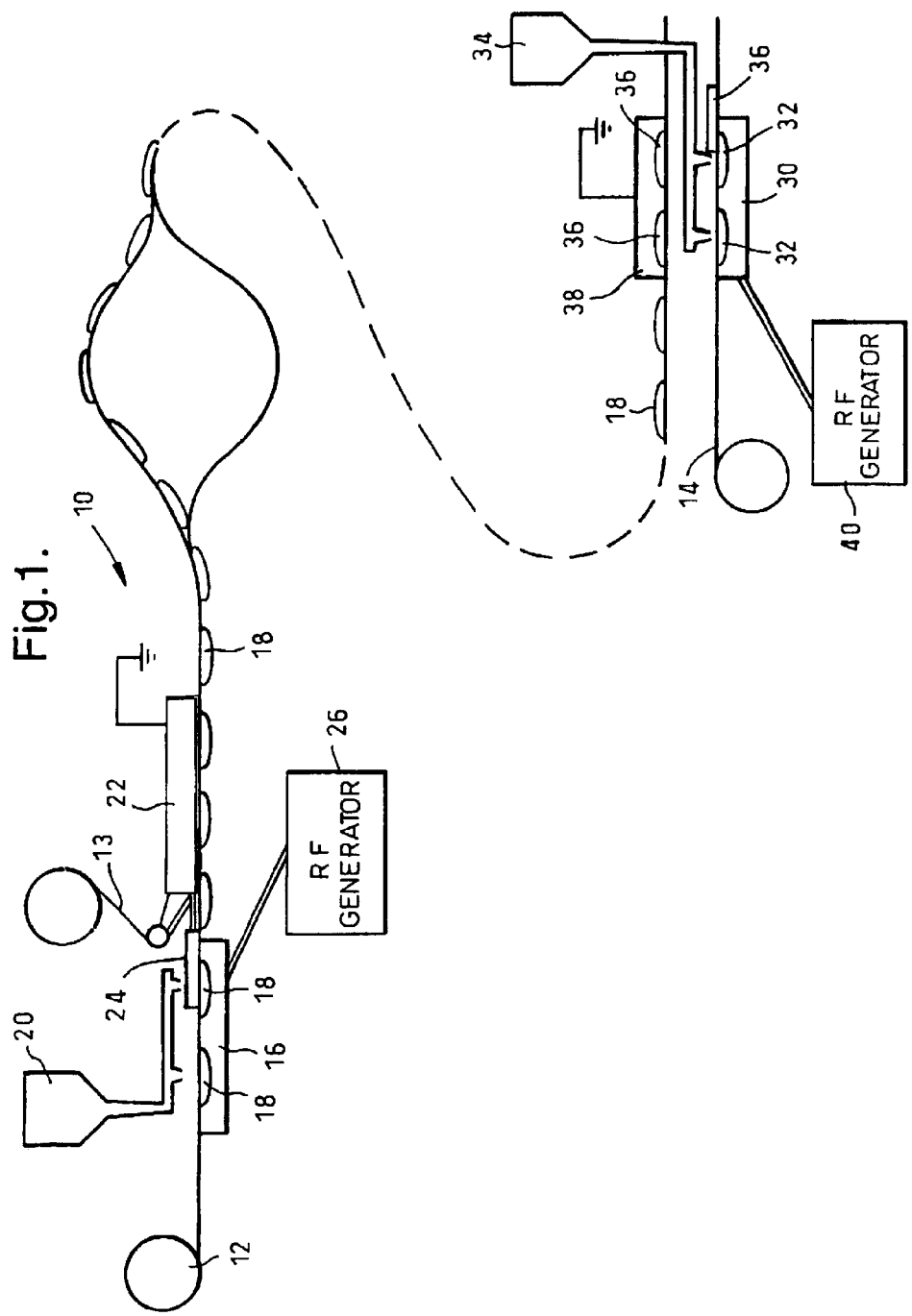
FIG. 1 is a schematic representation of an apparatus for making capsules.

Referring to FIG. 1, an apparatus 10 is shown diagrammatically for making filled capsules using three films 12,13, 14 of an ingestible polymeric material such as a cellulose derivative such as hydroxypropyl methyl cellulose. Two of the films 12 and 14 are of uniform thickness 0.20 mm for example, while the other film 13 is of uniform thickness 0.05 mm for example. Each film is dispensed from a respective roller. The films are indexed forward, as explained below, in steps using a transfer mechanism (not shown).

The first film 12 first passes over a heated metal die 16 whose upper surface defines an array of oval recesses 18 (only two are shown). The die 16 is held at a temperature of 60° C. for example, which softens the film 12, and a vacuum is then applied to ducts (not shown) communicating with each recess 18 so that the film 12 is deformed into the recesses 18. A filling mechanism 20 above the recesses 18 is then actuated to dispense the require material into the recesses 18. The die 16 and the film 12 are then moved horizontally until the die 16 is directly under an upper electrode 22. A scraping blade 24 is arranged just above the film 12 so that any filling material that projects above the recesses 18 is removed, and the film 13 is fed along a path just below the upper electrode 22.

The die 16 and the upper electrode 22 are pushed together by actuators (not shown), and a power supply 26 is activated to provide a high frequency supply to the die 16 (which acts as the lower electrode), the upper electrode 22 being connected to earth potential. In this specification the term high frequency is used in the sense conventional in the polymer industry, and in particular to encompass a frequency such as 27.12 MHz which is permissible for use in Europe for dielectric welding of polymeric materials. The polymeric material of the films 12 and 13 becomes heated between the electrodes 16 and 22 because of dielectric losses in the polymer. The opposed faces of the sheets 12 and 13 become hot enough to fuse together, whereas the outer faces which are in contact with the electrodes 16 and 22 remain at the temperature of the electrodes 16 and 22 respectively. Thus the sheets 12 and 13 are welded together at the locations where they are clamped between the die 16 and the upper electrode 22. In one example a power supply 26 working at a frequency of 27.12 MHz and a voltage of about 6 kV produced a satisfactory weld in a sheet of plasticised hydroxypropyl methyl cellulose of thickness about 0.1–0.2 mm, in a time of about 3 s. This process has been found to provide good quality welds without damaging the polymeric material, and in particular ionization, arcing, burning and degradation of the material are found not to occur.

Distortion of the sheets 12 and 13 as they cool down after welding can be suppressed by providing shallow grooves (not shown) in the upper surface of the die 16 between the recesses 18. For example if there is a rectangular array of recesses 18, the grooves may be a grid of straight lines between each row of recesses 18. Each groove may for example be of depth 0.20 mm and of width 1.5 mm. During the welding process the RF energy density is concentrated into the lands between the grooves and the recesses 18, and at these places the sheets 12 and 13 melt at their interface, there being some flow of molten polymer (due to the applied pressure from the actuators) so as to create a bead of molten material around the welded seam at the edge of each recess 18. The sheets 12 and 13 are not welded together where they overlie the grid of grooves, so these parts of the sheets tend not to distort.

The pressure of the actuators is then released, and the die 16 is lowered and then moved back to its starting position. The film 12 with filled recesses 16 covered by the thinner film 13 is hence released, and moves forward as the next set of recesses 18 is moved into the welding position. The film 12 is fed to a second welding position, being rotated through 180° during this transfer so that the recesses 18 are now on the upper surface of the film 12.

A similar sequence of operations takes place at the second welding position. The third film 14 is fed over a die 30 which, as with the die 16, forms an array of recesses 32 in the film 14. These recesses 32 are filled by a filling mechanism 34, and any excess removed by a scraper blade 35 (which are moved over the film 14 from the side). The recesses 18 in the film 12 locate in matching recesses 36 in an upper electrode 38. Both the electrode 38 and the die 30 are heated to 60° C. for example. Linear actuators (not shown) then push the electrode 38 and the die 30 together, so as to compress the covering film 13 onto the film 14, and a power supply 40 is activated to provide a high frequency supply to the die 30 (which acts as the lower electrode), the upper electrode 38 being connected to earth potential. Hence the upper and lower recesses are welded together to form capsules with a dividing membrane formed by the film 13, and these capsules can then be separated from the remaining web.

It will be appreciated that this apparatus 10 is shown diagrammatically, and in particular that the filling mechanism 34 might not be located underneath the upper electrode 38, but might (as with the first filling mechanism) be to one side of the upper electrode 38, the die 30 being movable horizontally between the filling position and the welding position. It will also be appreciated that a punch mechanism may be provided, either within the upper electrode 38 or at a separate station, to separate the capsules from the web.

The resulting capsules are thus of oval shape. Because the polymeric material melts during the welding process, a bead of molten material forms around the the welded seams on the inside of each capsule, so that after the capsules have been cut out the wall thickness is slightly thicker around the seam. The sealed nature of the capsules allows the filling material to be liquid, if desired, so that a wide range of pharmaceuticals can be delivered with such a capsule. By way of example each capsule might be of ellipsoidal shape, 10 mm long and 7 mm wide. The use of a cellulose derivative (such as hydroxypropyl methyl cellulose) for the sheets 12, 13 and 14, and so for the walls of the capsule, has advantages in view of the proven use of such material for pharmaceutical applications, and in view of its solubility in water and its lack of toxic effects.

The solubility of the capsule walls means that the capsules will break down quickly in a patient's stomach, giving rise to a fast release of the pharmaceutical. For some applications the speed of release may be excessively fast. In that case, or for aesthetic reasons or reasons of taste and handling, the capsules might be embedded in additional material such as a sugar coating for improved taste, or a less soluble coating to slow down release.

It is apparent from the description of the welding arrangements, that direct contact is made between the electrodes and the sheet of material being welded. Barrier sheets commonly used in dielectric welding are not required or used. This increases the acceptability of the process for pharmaceutical use, in avoiding the use of a potential source of contamination, particularly in view of the fibrous nature of common barrier materials.

Figure 2:
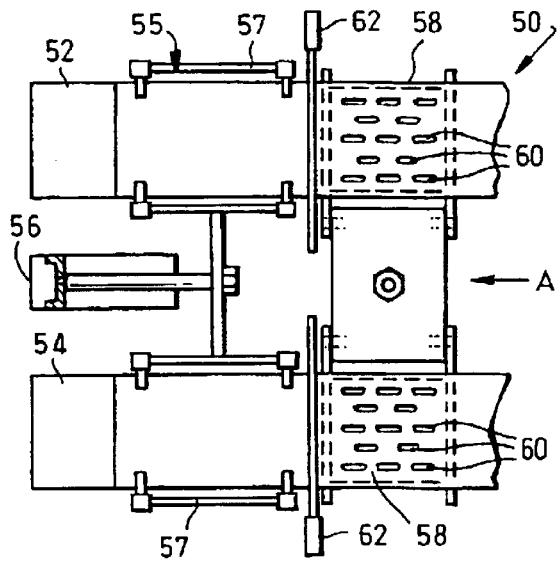
FIG. 2 is a schematic plan view of an alternative apparatus for making capsules.

Referring now to FIG. 2 an alternative apparatus 50 for making capsules is shown in plan view. Sheets 52 and 54 of water-soluble polymeric material of uniform thickness 0.15 mm for example are supplied from respective rolls, and moved forward by an indexing mechanism 55 consisting of an actuator 56 and respective side clamps 57. Each sheet 52 and 54 is moved to lie on top of a die 58 which is at a temperature of 60° C. for example, and whose upper surface defines an array of thirteen oval recesses 60. The portion of each sheet lying on top of the die 58 is cut off from the remainder of the sheet by a cutting mechanism 62; it is heated by contact with the die 58, and then a vacuum is applied to ducts at the base of each recess 60 so that the sheets 52 and 54 are deformed to form corresponding recesses.

Figure 3:
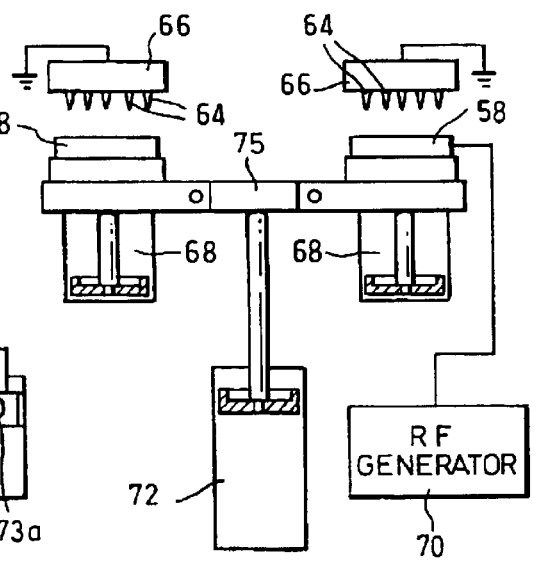
FIG. 3 is a view along arrow A of FIG. 2.

Referring now to FIG. 3, which shows a view in the direction of arrow A, above each die 58 is a multi-syringe dispensing mechanism 64 which is arranged to dispense precise quantities of material into each recess 60 formed in the sheet 52 or 54. Each dispensing mechanism is retractable into a respective upper electrode 66, which is connected to earth potential. After filling each recess in this manner the indexing mechanism 55 (see FIG. 2) is arranged to transfer another length of sheet 52 and 54 on top of the sheets with recesses; pneumatic actuators 68 are then operated to push the dies 58 onto the upper electrodes 66 and a radio frequency generator 70 (indicated schematically in FIG. 3) and connected to each of the dies 58 is activated so that the pairs of sheets 52 and 54 (respectively) are welded together by dielectric welding (substantially as described in relation to the apparatus 10 of FIG. 1).

Figure 4:
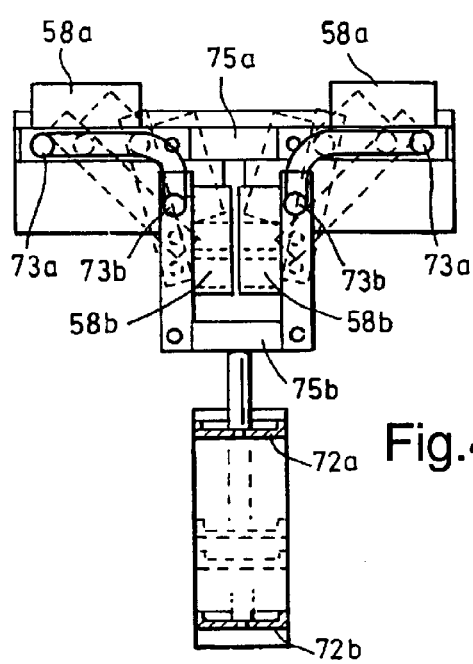
FIG. 4 is a further view along arrow A, illustrating the movement of the components.

The actuators 68 are then retracted. Referring now to FIG. 4, a pneumatic actuator 72 is connected by a mechanical linkage to both the dies 58, the linkage incorporating a roller 73 movable along a curved slot 74 in a base plate, and a link bar 75. Actuation of the actuator 72 causes the dies 58 to swing together so the recesses mate with each other; the initial positions of the components are indicated by the suffix a and the final positions by the suffix b, the intermediate positions being indicated by broken lines.

The generator 70 (see FIG. 3) is then activated, connected to one die 58b with the other die 58b connected to earth, so that the pairs of recesses are welded together to form capsules in a web. The actuator 72 can then be released to release the sheet of capsules. As described previously the capsules may be punched out of the web by a punch mechanism within the dies, or by a separate punch mechanism. Where a punch mechanism is provided within the dies, it may nevertheless be desirable to provide a dwell time after completion of the RF welding before operation of the punch mechanism. For example as mentioned in relation to the apparatus of FIG. 1 the weld may be generated in a time of about 3 s; after a subsequent dwell time of say between 2 s and 4 s the weld will have cooled down sufficiently that the punch mechanism may be activated. A benefit provided by the apparatus 50, as compared to the apparatus 10, is that the sheets, after forming and filling the recesses and covering with a cover sheet, are moved in one movement into alignment with each other so that there is less risk of misalignment due to deformation of one of the sheets.

What is claimed is:

1. A process for making capsules, the process using at least three films of polymeric material, and the process comprising the steps of deforming two of the films to form a multiplicity of recesses, filling the recesses with a flowable filling material with the films in a substantially horizontal position, welding a flat film onto at least one of the films with filled recesses to form a multiplicity of covered recesses containing the filling material, bringing the two films containing recesses together with the recesses aligned, and welding the films together, and cutting the filled enclosures from the remaining parts of the films so as to form a multiplicity of capsules, wherein the films are of a water-soluble or edible polymeric material, each film being dry and in equilibrium with ambient atmosphere containing humidity, wherein each welding step utilizes dielectric welding to weld the films together between a pair of substantially flat opposed welding electrodes, and wherein the recesses in each of the films are formed in the said multiplicity of corresponding recesses in the respective electrode, the recesses forming an array on the upper surface of the electrode, and in each welding step the recesses in at least one film remain in the recesses in the respective electrode.

2. A process as claimed in claim 1 wherein the films consist primarily of a water-soluble cellulose derivative.

3. A process as claimed in claim 2 wherein the films contain a water-soluble plasticiser.

4. A process as claimed in claim 1 wherein the filling materials in the recesses of the two films comprise different materials.

5. A process as claimed in claim 1 wherein each film in which recesses are formed is then covered by a respective flat film.

6. A process as claimed in claim 2 wherein the films contain a water-soluble or edible plasticiser.

7. A process as claimed in claim 1 wherein the welding is performed without use of barrier sheets between the electrodes and the films being welded.

* * * * *